Patented May 14, 1935

2,001,664

UNITED STATES PATENT OFFICE 2,001,664

METHOD OF MAKING CELLULAR CLAY PRODUCTS

Harry D. Foster, Logan, Ohio, assignor to National Fireproofing Corporation, Pittsburgh, Pa., a corporation of Pennsylvania No Drawing. Application June 15, 1933, Serial No. 675,972

5 Claims. (Cl. 25—156)

This invention relates to improvements in fired clay bodies of cellular structure as disclosed in Patent #1,897,667, granted to T. Husain et al., February 14, 1933, and it is among the objects thereof to provide a method of making cellular fired clay bodies which shall be highly refractory and adapted for use as a light weight refractory for insulating heating furnaces and other general uses.

The aforementioned patent discloses a method of producing cellular fired clay bodies by forming a clay water mixture containing carbonates and a dilute acid and permitting of chemical interaction between the carbonates and acid to develop a uniformly distributed gas throughout the mixture which upon subsequent hardening of the mixture produces a highly cellular product.

The process covered by this patent utilizes a hydrophil that serves to absorb water rapidly to accelerate the setting of the mixture which prevents rupture of the bubble walls and controls the size of the cells.

While this method is productive of an article having desirable physical properties which adapts it to a variety of uses, it is of limited temperature resistance because of the employment of a hydrophil which is either plaster of Paris or gypsum and which, while quite refractory and resistant to high temperatures when used alone, is a violent flux when employed in clay products that are subjected to high temperature.

The present invention has for its primary object the production of a cellular fired clay product possessing all of the advantages of the product disclosed in the patent referred to, and which in addition shall be free of any material which, when subjected to high temperature, would allow the thermal chemical reactions to go to completion.

Clay products have, at all times, been hardened or matured, by the application of heat. It is general practice to heat at such temperatures as will produce certain thermal chemical changes which are the combination of the different ingredients to form new silicates. If these thermal chemical reactions were allowed to go to completion, a homogeneous glass would result. Accordingly, in maturing or burning clay products, only sufficient reaction is desired to bond together the individual clay grains into one solid mass.

The presence of lime or calcium oxide in a clay product would cause the clay body to melt at considerably lower temperature and distort it so quickly that it cannot be fired satisfactorily. Lime is, therefore, an impurity which must be kept out of all clay bodies especially those used at high temperatures.

It is a well known fact that plaster of Paris or calcined gypsum takes water into chemical combination during the setting process. Plaster of Paris is the hemihydrate of calcium sulphate having the chemical formula $CaSO_4 \cdot \tfrac{1}{2}H_2O$. In other words, it is calcium sulphate with one half molecule of water in chemical combination. When this material is wetted or mixed with water it dissolves and recrystallizes in a new form, with two molecules of water in chemical combination having the chemical formula $CaSO_4 \cdot 2H_2O$. It is further known to all ceramists that only one or two per cent of water addition is required to render a clay, already in a paste sufficiently rigid to hold its shape, to a fluid state which can be poured or in which gas being released from chemical combination in numerous and evenly distributed small grains will remain as small globules or cells at or near the point of origin to give the cellular structure.

The small globule formed from the first gas released from chemical combination will not tend to leave its point of origin even though the fluid has a very low viscosity. As the globule grows in size the viscosity of the fluid should be increased to hold the globule in place to form the cell. This is exactly what takes place when plaster of Paris or calcined gypsum or any other hydrophil is included in the mix.

However, the plaster of Paris or gypsum is later broken down from the $CaSO_4 \cdot 2H_2O$ state in the burning of the ware to $CaSO_4$. $CaSO_4$ itself is not an active flux but it dissociates very rapidly to CaO when heated to approximate 2210° F. While rapid dissociation takes place at this temperature, it will take place at much lower temperatures especially when the kiln or furnace atmosphere is reducing or lacking in oxygen so that the products of combustion are essentially carbon-monoxide (CO) instead of carbon-dioxide ($CO_2$). In such case, the reactions are as follows:

$$CaSO_4 + CO \rightarrow CaSO_3 + CO_2$$
$$CaSO_3 + Heat \rightarrow CaO + SO_2$$

Thus, it has been shown that gypsum or plaster of Paris cannot be included in the body designed for a heat insulator to give service at high temperatures. However, in order to have the bloated body maintain its cellularity this invention makes use of a physical phenomenon instead of a chemical reaction thereby eliminating the use of violent fluxing chemicals. This physical phenomenon is that of direct and controlled absorption of the water by the basic ingredient of the clay body.

It is a well-known fact that when water and clay are mixed to give a fluid state, the water is used first to coat or form an envelope of microscopic thickness around each and every one of the clay particles so that they may flow or slip on one another. Thus when gas is generated in such a fluid mass and exerts pressure in all directions the clay grains will align themselves to form solid walls around each gas cell or partitions between all adjoining gas cells. This microscopic water envelope might be broken down by the taking up of water by the clay grains themselves. If the clay grains had an unused capacity for holding water they would absorb water by capillary attraction taking water from the water envelope surrounding each particle. As soon as sufficient water is absorbed to reduce this envelope to molecular thickness, the envelope breaks and thus stiffens the body. It is understood by all physicists that the absorption of water or any liquid by a solid is not instantaneous but is progressive with the time in contact with water. It is also understood by all ceramists that all clays, even in the finely divided and raw state, contain water either in chemical combination or in the interstices of the clay grain. These interstices are often filled or are usually partially filled with water which has been absorbed from the surface water which has been deposited thereon by condensation from the atmosphere.

In practicing this invention, the clay which is to be used is prepared by emptying these water-holding interstices and further creating additional ones by driving off the chemically combined water. This is accomplished by calcining the clay to be used as the base of the body. Thus the clay can be rapidly mixed with just sufficient water to render it to the fluid state. The gas generating materials are mixed with the dry clay and reaction is started as soon as they contact with water.

The reaction will progress far enough to form cells of the desired size by the time the clay grains have absorbed sufficient water to break the water envelopes and render them immobile. The bloated body will thus be able to stand without distortion or slumping as it does when ordinary raw clay and no hydrophil is used. This body will then dry and attain additional rigidity by the evaporation of the water comprising the envelope heretofore mentioned. The water absorbed by the clay grains just after bloating and which rendered the body rigid enough to stand without distortion need not be removed until in the burning process.

It should be remembered that in addition to the amount of water absorbed by the clay grains the rate of this absorption is an important factor in this process. This absorption is controlled by the size of the clay grains or fineness of grinding and also by the temperature to which the clay is calcined. For instance, it has been found that with one clay being used that clay should be calcined to approximately 1500° F., and ground to pass a 20 mesh standard sieve. The optimum calcination temperatures of other clays will vary with the nature of the clay; and the optimum size of grain will also vary with the clay and the texture of the product desired.

The gas generating materials mixed with the dry clay may be dolomite as disclosed in Patent #1,897,667 referred to above, and the water for moistening the clay may be a three percent solution of sulphuric or hydrochloric acid, the mix being blunged until a smooth creamy consistency is obtained. The creamy slip is poured into individual molds or on a casting table where the chemical reaction between the ingredients continues for some minutes until the body is set sufficiently for further handling. The cellular clay mass is then subjected to a firing temperature.

I claim:

1. The method of making cellular clay material which comprises, grinding clay to a fine grain size, subjecting the clay to a calcination temperature, mixing the dry clay with a gas generating material and then with a dilute acid, agitating said mixture until it attains a smooth, creamy consistency, allowing interaction between the gas generating material and acid to produce a cell forming gas throughout the entire body of the mixture, and subjecting the cellular clay mass to a firing temperature.

2. The method of making cellular clay material which comprises, grinding clay to pass a 20 mesh sieve, subjecting the clay to the optimum calcination temperature of the particular clay, mixing the calcinated dry clay with a gas generating material, and then with a dilute acid, agitating said mixture until it attains a smooth, creamy consistency, allowing interaction between the gas generating material and acid to produce a cell forming gas throughout the entire body of the mixture, and subjecting the cellular clay mass to a firing temperature.

3. The method of making cellular clay material which comprises, grinding clay to a fine grain size, subjecting the clay to the optimum calcination temperature of the particular clay, mixing the dry clay with a gas generating material and water, agitating said mixture until it attains a smooth, creamy consistency, allowing interaction between the gas generating materials to produce a cell forming gas throughout the entire body of the mixture, and subjecting the cellular clay mass to a firing temperature.

4. The method of making cellular clay material which comprises, grinding clay to pass a 20 mesh standard sieve, subjecting the clay to a calcination temperature, mixing the dry clay with dolomite and then with a dilute acid, agitating said mixture until it attains a smooth, creamy consistency, allowing interaction between the dolomite and acid to produce a cell forming gas throughout the entire body of the mixture, and subjecting the cellular clay mass to a firing temperature.

5. The method of making cellular clay material which comprises grinding clay to a fine grain size, subjecting the clay to the optimum calcination temperature of the particular clay, mixing the dry clay with a liquid and a soluble substance for making the body cellular, agitating said mixture until it attains a smooth creamy consistency with cells formed throughout the entire body of the mixture, and subjecting the cellular clay mass to a firing temperature.

HARRY D. FOSTER.